(12) United States Patent
Levy (10) Patent No.: US 12,189,482 B1
(45) Date of Patent: Jan. 7, 2025

(54) PROTECTING A LOCK DATA STRUCTURE

(71) Applicant: VAST DATA LTD., Tel Aviv (IL)

(72) Inventor: Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/500,989

(22) Filed: Nov. 2, 2023

(51) Int. Cl.
*G06F 11/00* (2006.01)
*G06F 11/07* (2006.01)
*G06F 11/14* (2006.01)

(52) U.S. Cl.
CPC ...... *G06F 11/1423* (2013.01); *G06F 11/0757* (2013.01)

(58) Field of Classification Search
CPC ............... G06F 11/1423; G06F 11/0757
USPC .................................................. 714/3
See application file for complete search history.

(56) References Cited

U.S. PATENT DOCUMENTS

| 9,542,414 | B1* | 1/2017 | Zumach | G06F 16/2343 |
| 2003/0079155 | A1* | 4/2003 | Kingsbury | G06F 11/0709 |
| | | | | 714/2 |
| 2007/0214161 | A1* | 9/2007 | Goyal | G06Q 30/02 |
| 2014/0379645 | A1* | 12/2014 | Wickremesinghe | G06F 11/203 |
| | | | | 707/624 |
| 2024/0078134 | A1* | 3/2024 | Kumar | G06F 9/5027 |

\* cited by examiner

*Primary Examiner* — Jason B Bryan
(74) *Attorney, Agent, or Firm* — Reches Patents (57) ABSTRACT

A method for protecting a lock data structure, the method includes obtaining, by a compute entity of a storage system, a lock recovery indication and a cycle counter; executing, by the compute entity, at least a part of the current lock recovery process, wherein the executing of the at least part of the current lock recovery process includes (i) determining, by the compute entity, using a compute entity data structure that is indicative of lock fields that represent locks acquired by the compute entity, whether the segment comprised a compute-entity-relevant lock field, wherein the compute-entity-relevant lock field (a) belonged to the segment upon the occurrence of the failure and (b) represents a lock was acquired by the compute entity; and (ii) re-acquiring, by the compute entity, a re-acquired lock that corresponds to the compute-entity-relevant lock field, when it is determined that the segment comprised the compute-entity-relevant lock field.

19 Claims, 4 Drawing Sheets

PROTECTING A LOCK DATA STRUCTURE

BACKGROUND

Stored entities in a storage system may be accessed by multiple compute entities simultaneously. Locking the access towards the stored entities prior to accessing is a mechanism used to facilitate mutual exclusion so as to protect shared access to these stored entities.

Upon a failure to access a memory that stores a lock data structure that implements the lock mechanism, the stored entities whose access depends on the lock mechanism may not be accessible or their data integrity may be compromised.

Redundancy is required for the implementation of the lock data structure, to allow recovering from a failure, without increasing the latency that will be experienced when needing to implement a redundant lock data structure.

SUMMARY

There may be provide a storage system, a method and a non-transitory computer readable medium for protecting a lock data structure.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

A shared lock data structure is stored in one or more storage devices that compose a shared storage space that is accessible to all compute nodes of a storage system, wherein the lock data structure includes a lock field per each lockable stored entity of the storage system that can be accessed by multiple compute nodes (a stored entity may be e.g., a file, a RAID stripe, a storage memory range, etc.). Each lock field stores a lock state value, that generally includes values indicating whether the lock is acquired or freed. For example, the lock state may be a Boolean value for "locked" (=1) and "unlocked" (=0). According to another example, a locked state may be represented by a compute node identifier of the compute node that acquired the lock, wherein the compute node identifier is larger than zero, and zero represents an unlocked state.

The shared lock data structure needs to be redundant for recovering from a failure of a storage device that stores the shared lock data structure or segments thereof. However, given that the shared lock data structure is stored in storage nodes that are external to the compute nodes, accessing the shared lock data structure, over a network or fabric, involves a relatively high latency, comparing to an access towards a local memory of a compute node. Therefore, it may not be advantageous to have a second or third mirrored copy of the shared lock data structure in the shared storage space.

Each compute node manages a local lock data structure that includes a list of locks it acquired at the shared lock data structure, i.e., references to all the lock fields that are currently locked by the compute node.

When a lock manager of the storage system detects that access to one or more segments of the shared lock data structure have failed, e.g., due to a failure of at least one storage device that stores the one or more segments—a lock recovery process starts.

The lock manager allocates a non-failed storage space for reconstructing the one or more failed segments of the shared lock data structure. Then it assigns a default lock state value (that is different from values representing "locked" or "unlocked" states) for each lock field of the reconstructed segment in the new location, to indicate that the value of the lock field is under reconstruction, which means that it is not known whether the lock field should have a lock or unlock value, during at least part of the reconstruction.

The storage system employs a lock version (also referred to as a cycle counter) that may be shared among the compute nodes, either by being stored in the shared storage space or may be broadcast to all the compute nodes when the value of the lock version is changed. The lock version is incremented each time a recovery is completed, where one or more segments of the shared lock data structure have been recovered.

The lock manager may use the current value of the lock version to produce the default lock state value that is assigned to all the failed lock fields. The range of values that can be used as the default lock state values is different from the range of values assigned to a locked state. For example, if a locked state is represented by the identifiers of compute nodes that acquired the locks, the values, e.g., 1-1000 may represent lock versions, and values above 1000 may represent the identifiers of the locking compute nodes.

Once all the failed lock fields are set with the default lock state values indicative of the current value of the lock version, it sends a lock recovery message to all the compute nodes, informing about needing to reconstruct the one or more failed segments in new allocated storage location that is indicated in the lock recovery message.

Once receiving the lock recovery message (or otherwise obtaining the lock recovery indication provided by the message, or by other means used to share the lock recovery indication), each compute node uses the local lock data structure, for re-acquiring the corresponding lock fields, according to the references to the lock fields listed in the local lock data structure.

Once all the compute nodes acknowledge completion of recovering of their locks, the lock manager increments the value of the lock version, by either updating a shared stored value of the lock version, or by broadcasting the new value of the lock version.

During the lock reconstruction phase and after the completion of the lock reconstruction, acquiring of new locks and lock releasing is still an ongoing procedure, that should take into account the states of the locks. The lock reconstruction phase that includes re-acquiring locks (that were acquired prior to the failure) may be performed in parallel to the acquiring of new locks.

When a compute node needs to acquire a lock and founds that the corresponding lock field includes a value that represents the current known lock version, it can determine that a lock recovery process is currently being performed, so that the current lock status of the lock field is not known. In this case, it will wait until it detects that the lock version is advanced (which means that the lock recovery is completed), e.g., by either monitoring the shared lock version, or by waiting for receiving a new value of the lock version. Once the current lock version is advanced, the compute node repeats the lock attempt. The compute node may also wait until the lock field indicates a released lock and before the completion of the recovery process, which may happen when during the recovery process, another compute node (that owned the lock) released the lock.

When a compute node tries to unlock, it can unlock even if the lock field indicates an ongoing lock recovery, i.e. when releasing a lock that is acquired by the compute node, the lock field has a value of a current lock version.

When a compute node needs to acquire a lock and founds that the corresponding lock field includes a value that indicates a lock version that is older (smaller) than the current known lock version, it can determine that the lock recovery process is over, or—that no other compute node acquired this lock since the last lock recovery, so—the compute node can set the value of the lock field to 'locked'.

If a compute node tries to release a lock that is acquired by the compute node, and founds a value of a previous lock version in the lock field—it means that this is a bug, since the compute node should have update the lock field to the locked value upon the recovery process. The compute node may alert about the mismatched value.

Figure 1:
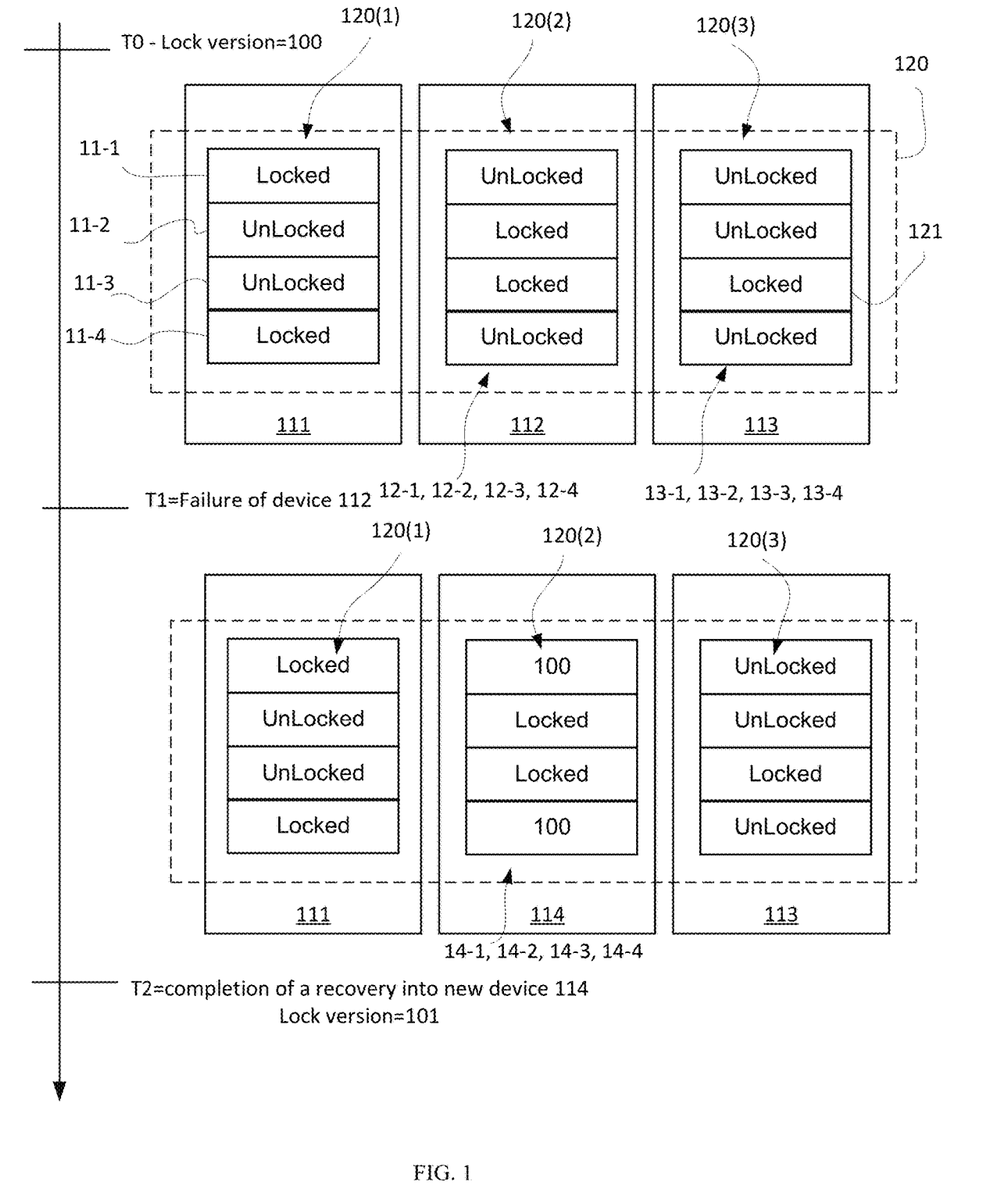
FIG. 1 illustrates an example of a shared lock data structure.

FIG. 1 illustrates a shared lock data structure 120 wherein different segments (denoted 120(1), 120(2) and 120(3)) of the shared lock data structure 120 are stored in different storage devices 111-113—each including memory spaces that include four memory sub-spaces for storing four lock fields. In this example, three segments are stored in three storage devices. The different segments may be spread across different failure domains other than storage devices, e.g., across different storage nodes, different zones of one storage device, different erase blocks, etc. The term lock field refers to a logical location within the shared lock data structure or within the segment, while the term sub-space refers to a physical location where the lock field resides.

At this stage, when no failure has yet occurred, the lock fields (collectively denoted 121) can store the values representing a locked state or unlocked state. The lock version was set at TO, to e.g., 100. At this stage, at storage device 111—memory sub-spaces 11-1 and 11-4 represent a locked state, and memory sub-spaces 11-2 and 11-3 represent an unlocked state. At storage device 112—memory sub-spaces 12-2 and 12-3 represent a locked state, and memory sub-spaces 12-1 and 12-4 represent an unlocked state. At storage device 113—memory sub-space 13-3 represents a locked, and memory sub-spaces 13-1, 13-2 and 13-4 represents an unlocked state.

At time T1, storage device 112 is failed, and a recovery process for reconstructing the segment 120(2) that was stored on storage device 112 onto a new storage device 114—is conducted. All the lock fields in the lock segment at the new storage device 114 are initially set to the default value of the current lock version, e.g., 100. The compute nodes that acquired locks on that segment update the corresponding lock fields to the value that represents a locked state. Other lock fields remain with the value of the lock version, that indicates, during at least part of the recovery process (and until updated by a locking compute node—if such exists), that the lock state of the lock field is unknown, and indicates, after the completion of the recovery process that the lock field is in an unlocked state.

At T2, the recovery process is over, and the lock version is updated, e.g., incremented to 101. At this stage when the values of lock fields indicate a previous lock version, e.g., 100, the compute nodes can compare the lock version written in the lock fields to the current lock version, so as to determine that the lock fields indicating a lock version value of 100—are actually unlocked.

At this stage, at storage device 111—memory sub-spaces 11-1 and 11-4 represent a locked state, and memory sub-spaces 11-2 and 11-3 represent an unlocked state. At storage device 114—memory sub-spaces 14-2 and 14-3 represent a locked state, and memory sub-spaces 14-1 and 14-4 include a value that can represent an unlocked state, even though they include a value that represents a lock version rather than a regular unlock indication state. At storage device 113—memory sub-space 13-3 represent a locked state, and memory sub-spaces 13-1, 13-2 and 13-4 represent an unlocked state.

The process of lock recovery can be repeated when further storage devices that include segments of the shared lock data structure—are failed. The completion of each further lock recovery is followed by an update of the lock version, therefore the lock version represents the number of previously completed lock recovery cycles.

Figure 2:
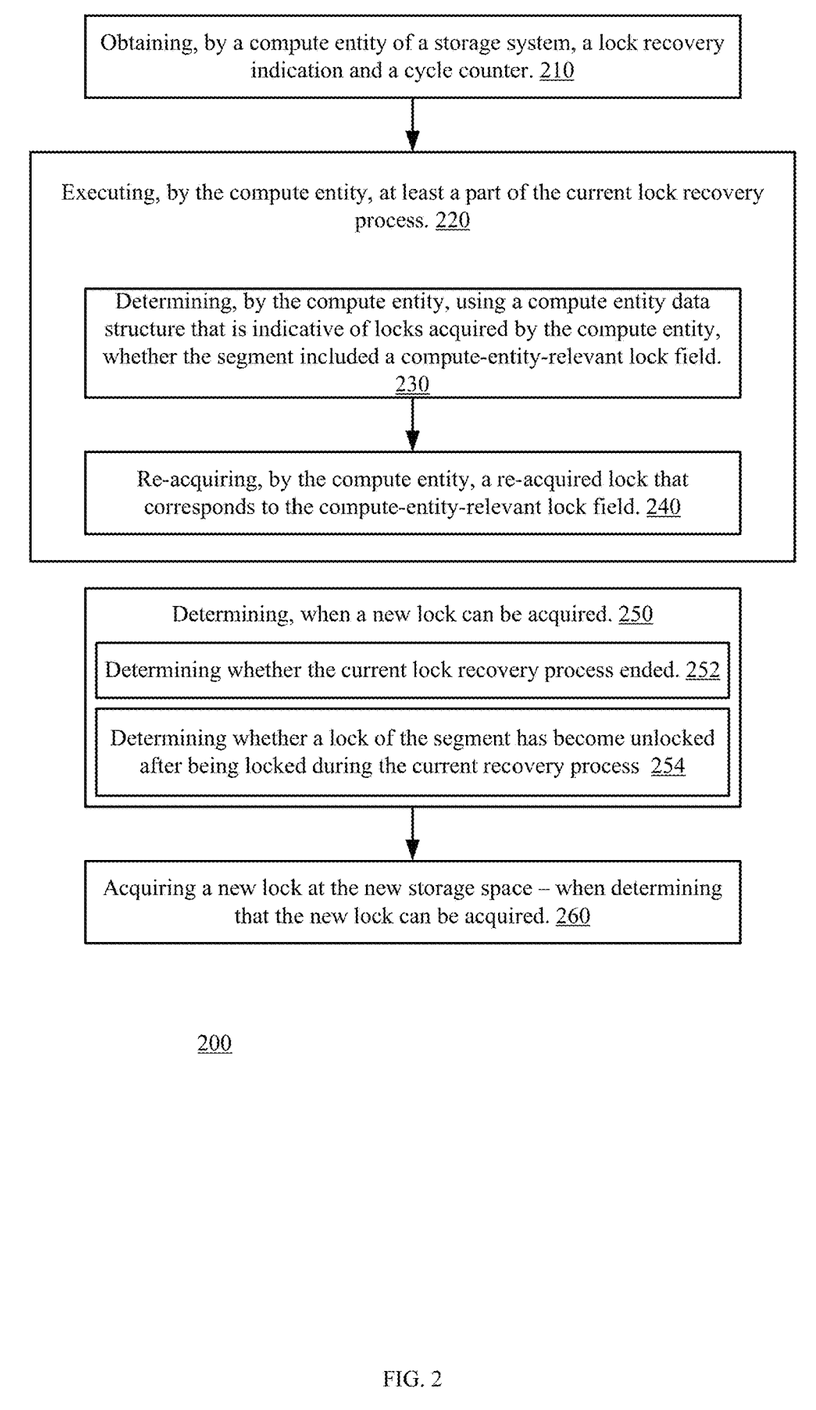
FIG. 2 illustrates an example of a method.

FIG. 2 illustrates an example of method 200 for protecting a lock data structure.

According to an embodiment, method 200 includes step 210 of obtaining, by a compute entity of a storage system, a lock recovery indication and a cycle counter.

The cycle counter is indicative of a number of previously completed lock recovery cycles. An example of a cycle counter is a lock version.

The lock recovery indication is indicative of a new storage space within a storage entity of the storage system. The storage entity may be a storage device, a partition or zone or any other part of a storage device, a storage node, etc. According to an embodiment, the lock recovery indication includes the address of the new storage space (for example—the address of new storage device 114 or an address within the new storage device 114). The new storage space is allocated for storing a segment of the lock data structure. The segment was stored in another storage space (for example within storage device 112) of the storage system upon (and before) an occurrence of a failure that triggered a current lock recovery process. The failure causes the segment's content to become inaccessible in the other storage space.

According to an embodiment, step 210 of obtaining includes receiving and/or retrieving the lock recovery indication following the failure.

According to an embodiment, step 210 is followed by step 220 of executing, by the compute entity, at least a part of the current lock recovery process.

According to an embodiment, one or more compute entities of the storage system participate in the execution of the current lock recovery process—and the compute entity may execute only a part of the current lock recovery process, e.g., each of the one or more compute entities is responsible for reconstructing lock fields that represent locks taken by each of the one or more compute entities.

According to an embodiment, step 220 includes step 230 of determining, by the compute entity, using a compute entity data structure that is indicative of locks acquired by the compute entity, whether the segment included a compute-entity-relevant lock field. A compute-entity-relevant lock field (a) belonged to the segment upon (and before) the occurrence of the failure; and (b) represents a lock that was acquired by the compute entity and not yet released at the time of determination. The compute entity data structure is stored in a local storage space included in the compute entity or is locally accessed by the compute entity, without needing to traverse a network or fabric. The compute entity data structure includes all the locks that are currently occupied by the compute entity, including the lock corresponding to the compute-entity-relevant lock field and possibly multiple compute-entity-relevant lock fields, which represent locks acquired by the compute node.

According to an embodiment, when the answer is positive step 230 is followed by step 240 of re-acquiring, by the compute entity, a re-acquired lock that corresponds to the compute-entity-relevant lock field. According to an embodiment, step 230 is executed without delay—in the sense that it may be executed during the current lock recovery process.

According to an embodiment, step 240 includes (or is followed by) sending a re-acquiring completion indication following a completion of the re-acquiring. The sending of the re-acquiring completion indication may follow a completion of re-acquiring of all the locks corresponding to the multiple compute-entity-relevant lock fields.

According to an embodiment, step 230 is executed before an ending of the current lock recovery process.

According to an embodiment, method 200 further includes steps 250 and 260 that are not a part of step 220 and may be executed in parallel to and/or is a partially overlapping manner or in a non-overlapping manner to step 220.

According to an embodiment, step 250 includes determining when a new lock can be acquired. A new lock is regarded as a lock that is not a re-acquired lock- and it does not correspond to the compute-entity-relevant lock field. The new lock corresponds to a lock that was not acquired by the compute entity before obtaining the lock recovery indication. This is a new lock requirement in response to ongoing access processes that are not part of the recovery process.

According to an embodiment, step 250 includes step 252 of determining whether the current lock recovery process ended. According to an embodiment, step 252 includes comparing (a) a value of the cycle counter at a time of the comparing, to (b) a default lock state value that was assigned, during the current lock recovery process, to multiple sub-spaces of the new storage space. The default lock state value represents a value of the cycle counter at a beginning of the current lock recovery process—see, for example lock version set to 100—in FIG. 1—in which the default lock state value equals a value of the cycle counter at the beginning of the current lock recovery process. It should be noted that the default lock state value may differ from the value of the cycle counter at the beginning of the current lock recovery process.

According to an embodiment, step 250 includes step 254 of determining whether a lock of the segment has become unlocked after being re-acquired during the current recovery process.

According to an embodiment, step 250 include determining whether a compute entity that was entitled to re-acquire a lock decided to release the lock and not to reacquire the lock.

According to an embodiment, method 200 includes step 260 of acquiring a new lock at the new storage space—when determining that the new lock can be acquired.

According to an embodiment, step 260 is executed following an end of the current lock recovery process.

According to an embodiment, step 260 is executed following the releasing of the lock of the segment, by another compute entity that owned the lock, during the current recovery process.

According to an embodiment, the default lock state value differs from a lock state value that indicates a locked state indicated by a lock field and differs from a lock state value that indicates that an unlocked state indicated by the lock field.

According to an embodiment, the compute-entity-relevant lock field was stored at certain sub-space located at a certain location within the other storage space. The re-acquiring includes selecting a new storage sub-space to store the re-acquired lock field based on the certain location.

According to an embodiment, the compute entity belongs to a group of compute entities of the storage system. The storage entity belongs to a group of storage entities of the storage system. The group of the compute entities and the group of the storage entities are in communication with each other via one or more networks.

Figure 3:
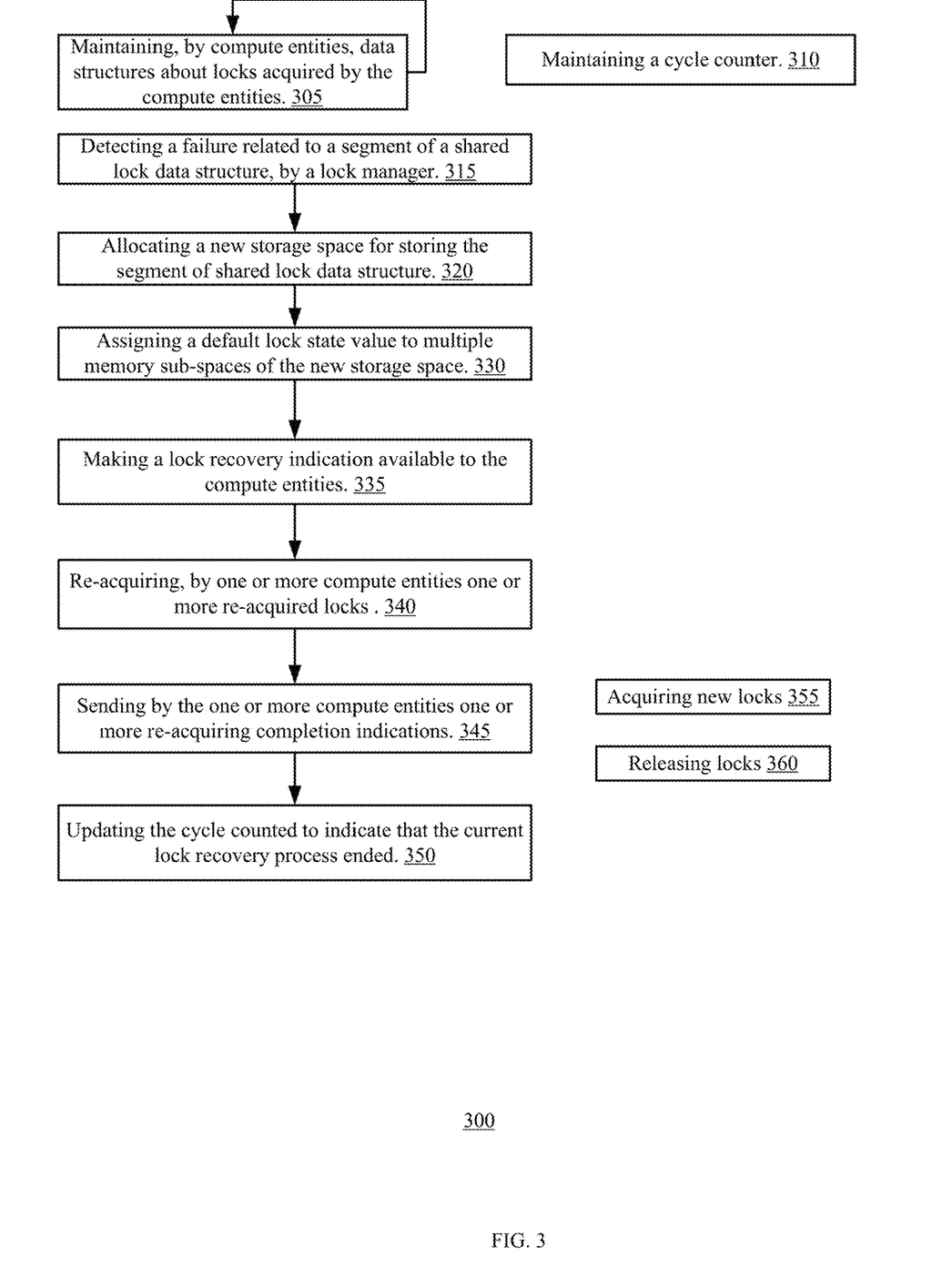
FIG. 3 illustrates an example of a method.

FIG. 3 illustrates an example of a method 300.

According to an embodiment, method 300 includes steps 305, 310 and 315.

According to an embodiment, step 305 include maintaining by compute entities, data structures about locks acquired by the compute entities. This is a part of maintaining and releasing locks.

According to an embodiment, step 310 includes maintaining a cycle counter.

According to an embodiment, step 315 includes detecting a failure related to a segment of a shared lock data structure, by a lock manager.

According to an embodiment, step 315 is followed by step 320 of allocating a new storage space for storing the segment of the shared lock data structure.

According to an embodiment, step 320 is followed by step 330 of assigning a default lock state value to multiple memory sub-spaces of the new storage space.

According to an embodiment, step 330 is followed by step 335 of making a lock recovery indication available to the compute entities.

According to an embodiment, step 335 is followed by step 340 of re-acquiring, by one or more compute entities, one or more re-acquired locks.

According to an embodiment, step 340 is followed by step 345 of sending by the one or more compute entities, one or more re-acquiring completion indications.

According to an embodiment, step 345 is followed by step 350 of updating the cycle counter to indicate that the current lock recovery process ended, after receiving the one or more re-acquiring completion indications. According to an embodiment, step 345 is followed by step 350 upon an expiration of a time period in which the one or more re-acquiring completion indications are expected to be received.

According to an embodiment, method 300 also includes step 360 of releasing locks and step 355 of acquiring new locks 355. Examples of when new locks are acquired are provided in step 250 of method 200.

Figure 4:
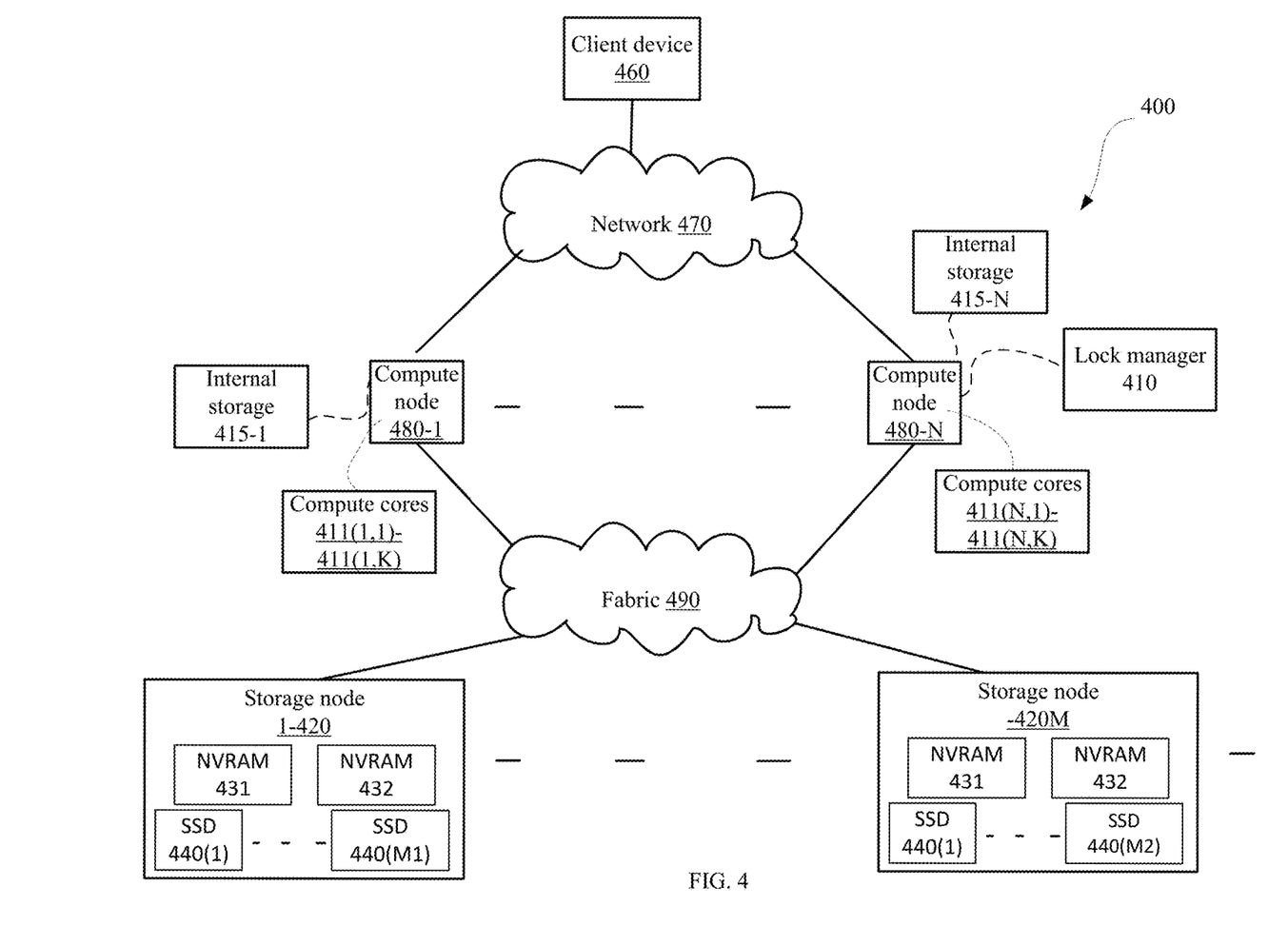
FIG. 4 is an example of a storage system.

FIG. 4 shows an example diagram of a storage system 400 according to the disclosed embodiments.

The storage system 400 includes a number of N compute nodes 480-1 through 480-N (hereinafter referred to individually as a compute node 480 and collectively as compute nodes 480, merely for simplicity purposes, N is an integer equal to or greater than 1). The compute nodes include (or may execute) multiple compute cores each—see for example compute cores 411(1,1)-411(1,K) and compute cores 411(N,1)-411(N,K). The compute nodes 480-1 to 480-N further includes internal storage 415-1 to 415-N for storing the compute entities' data structures. A compute core can be a processing circuitry, a part of processing circuitry, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits. The compute entities may be the compute nodes or the compute cores.

The storage system 400 also includes a number of M storage nodes 420-1 through 420-M (hereinafter referred to individually as a storage node 420 and collectively as storage nodes 420, merely for simplicity purposes, M is an integer equal to or greater than 1). The compute nodes 480 and the storage nodes 420 are connected through a communication fabric 490. M may equal N or may differ from N.

Each compute node 480 interfaces with multiple client devices such as a client device 460 (or an application installed therein) via a network 470. To this end, a compute node 480 is configured to receive requests (e.g., read or write requests) and promptly serve these requests in a persistent manner. The network 470 may be, but is not limited to, the Internet, the world-wideweb (WWW), a local area network (LAN), a wide area network (WAN), and the like.

In an embodiment, a compute node 480 is configured to interface with different protocols implemented by the client devices or applications (e.g., TCP/IP, HTTP, FTP, various filesystem protocols, etc.) and to manage the read and write operations to the storage nodes 420.

A lock manager 410 may be one of the compute nodes—or may be another entity.

According to an embodiment, the compute nodes are configured to perform one or more steps of method 200 and/or method 300.

The storage nodes 420 provide the storage and state in the system 400. Each storage node 420 may include a plurality of SSDs, such as SSDs 440, for example storage node 420-1 includes M1 SSDs 440(1)-340(M1). Each storage node further includes fast accessed memory for storing segments of the lock data structure, such as NVRAM 431 and 432 of FIG. 4.

The storage nodes 420 may be configured to have the same capacity as each other or different capacities from each other. In an embodiment, the data stored in each storage node 420 is made redundant internally within the storage node, made redundant at a different storage node, or both.

A storage node 420 may be configured to communicate with the compute nodes 480 over the communication fabric 490. It should be noted that each compute node 480 can communicate with each storage node 420 over the communication fabric 490. There may not be a direct coupling between a compute node 480 and storage node 420. The operations of locking (acquiring locks) and unlocking (releasing lock) are transmitted over the communication fabric from the compute node to one of the storage nodes. Accessing the compute node lock data structure in the internal storage 415 does not require transmittion over a fabric or any communication network.

In the embodiment, the communication fabric 490 may include an Ethernet fabric, an InfiniBand fabric, and the like. Specifically, the communication fabric 490 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for protecting a lock data structure, the method comprising:
   obtaining, by a compute entity of a storage system, a lock recovery indication and a cycle counter; the cycle counter is indicative of a number of previously completed lock recovery cycles; the lock recovery indication is indicative of a new storage space within a storage entity of the storage system, the new storage space is allocated for storing a segment of the lock data structure, the segment was stored in another storage space of the storage system upon an occurrence of a failure that triggered a current lock recovery process; and
   executing, by the compute entity, at least a part of the current lock recovery process, wherein the executing of the at least part of the current lock recovery process comprises:
   (i) determining, by the compute entity, using a compute entity data structure that is indicative of lock fields that represent locks acquired by the compute entity, whether the segment comprised a compute-entity-relevant lock field, wherein the compute-entity-relevant lock field (a) belonged to the segment upon the occurrence of the failure and (b) represents a lock was acquired by the compute entity;
   (ii) re-acquiring, by the compute entity, a re-acquired lock that corresponds to the compute-entity-relevant lock field, when it is determined that the segment comprised the compute-entity-relevant lock field;
   determining whether the current lock recovery process ended, by comparing (a) a value of the cycle counter at a time of the comparing, to (b) a default lock state value that was assigned, during the current lock recovery process, to multiple sub-spaces of the new storage space, wherein the default lock state value represents a value of the cycle counter at a beginning of the current lock recovery process; and acquiring a new lock at the new storage space following at least one of (a) an end of the current lock recovery process or (b) a releasing of a lock of the segment during the current recovery process.

2. The method according to claim 1 wherein the default lock state value differs from a lock state value that indicates that a locked state and differs from a lock state value that indicates an unlocked state.

3. The method according to claim 1, wherein the compute-entity-relevant lock field was stored at certain sub-space located at a certain location within the other storage space, wherein the re-acquiring comprises selecting a new storage sub-space to store are-acquired lock field that represents the re-acquired lock, based on the certain location.

4. The method according to claim 1, wherein the re-acquiring is executed before an ending of the current lock recovery process.

5. The method according to claim 1, further comprising sending a re-acquiring completion indication following a completion of the re-acquiring.

6. The method according to claim 1, wherein the default lock state value equals a value of the cycle counter at the beginning of the current lock recovery process.

7. The method according to claim 1, wherein the compute entity belongs to a group of compute entities of the storage system, wherein the storage entity belongs to a group of storage entities of the storage system, wherein the group of the compute entities and the group of the storage entities are in communication with each other via one or more networks.

8. A non-transitory computer readable medium for protecting a lock data structure, wherein the non-transitory computer readable medium stores instructions for:

obtaining, by a compute entity of a storage system, a lock recovery indication and a cycle counter; the cycle counter is indicative of a number of previously completed lock recovery cycles; the lock recovery indication is indicative of a new storage space within a storage entity of the storage system, the new storage space is allocated for storing a segment of the lock data structure, the segment was stored in another storage space of the storage system upon an occurrence of a failure that triggered a current lock recovery process; and executing, by the compute entity, at least a part of the current lock recovery process, wherein the executing of the at least part of the current lock recovery process comprises:

(i) determining, by the compute entity, using a compute entity data structure that is indicative of lock fields that represent locks acquired by the compute entity, whether the segment comprised a compute-entity-relevant lock field, wherein the compute-entity-relevant lock field (a) belonged to the segment upon the occurrence of the failure and (b) represents a lock was acquired by the compute entity;

(ii) re-acquiring, by the compute entity, a re-acquired lock that corresponds to the compute-entity-relevant lock field, when it is determined that the segment comprised the compute-entity-relevant lock field;

determining whether the current lock recovery process ended, by comparing (a) a value of the cycle counter at a time of the comparing, to (b) a default lock state value that was assigned, during the current lock recovery process, to multiple sub-spaces of the new storage space, wherein the default lock state value represents a value of the cycle counter at a beginning of the current lock recovery process; and acquiring a new lock at the new storage space following at least one of (a) an end of the current lock recovery process or (b) a releasing of a lock of the segment during the current recovery process.

9. The non-transitory computer readable medium according to claim 8, wherein the default lock state value differs from a lock state value that indicates that a locked state and differs from a lock state value that indicates an unlocked state.

10. The non-transitory computer readable medium according to claim 8, wherein the compute-entity-relevant lock field was stored at certain sub-space located at a certain location within the other storage space, wherein the re-acquiring comprises selecting a new storage sub-space to store are-acquired lock field that represents the re-acquired lock, based on the certain location.

11. The non-transitory computer readable medium according to claim 8, wherein the re-acquiring is executed before an ending of the current lock recovery process.

12. The non-transitory computer readable medium according to claim 8, that further stores instructions for sending a re-acquiring completion indication following a completion of the re-acquiring.

13. The non-transitory computer readable medium according to claim 8, wherein the default lock state value equals a value of the cycle counter at the beginning of the current lock recovery process.

14. A storage system comprising:

one or more storage entities that comprise a new storage space and another storage space; and a compute entity that is configured to:

obtain a lock recovery indication and a cycle counter; the cycle counter is indicative of a number of previously completed lock recovery cycles; the lock recovery indication is indicative of a new storage space within a storage entity of the storage system, the new storage space is allocated for storing a segment of the lock data structure, the segment was stored in another storage space of the storage system upon an occurrence of a failure that triggered a current lock recovery process; and executing, by the compute entity, at least a part of the current lock recovery process, wherein the executing of the at least part of the current lock recovery process comprises:

(i) determining, by the compute entity, using a compute entity data structure that is indicative of lock fields that represent locks acquired by the compute entity, whether the segment comprised a compute-entity-relevant lock field, wherein the compute-entity-relevant lock field (a) belonged to the segment upon the occurrence of the failure and (b) represents a lock was acquired by the compute entity;

(ii) re-acquiring, by the compute entity, a re-acquired lock that corresponds to the compute-entity-relevant lock field, when it is determined that the segment comprised the compute-entity-relevant lock field;

determine whether the current lock recovery process ended, by comparing (a) a value of the cycle counter at a time of the comparing, to (b) a default lock state value that was assigned, during the current lock recovery process, to multiple sub-spaces of the new storage space, wherein the default lock state value represents a value of the cycle counter at a beginning of the current lock recovery process; and acquire a new lock at the new storage space following at least one of (a) an end of the current lock recovery process or (b) a releasing of a lock of the segment during the current recovery process.

15. The storage system according to claim 14, wherein the default lock state value differs from a lock state value that indicates that a locked state and differs from a lock state value that indicates an unlocked state.

16. The storage system according to claim 14, wherein the compute-entity-relevant lock field was stored at certain sub-space located at a certain location within the other storage space, wherein the re-acquiring comprises selecting a new storage sub-space to store are-acquired lock field that represents the re-acquired lock, based on the certain location.

17. The storage system according to claim 14, wherein the re-acquiring is executed before an ending of the current lock recovery process.

18. The storage system according to claim 14, wherein the compute entity is further configured to send a re-acquiring completion indication following a completion of the re-acquiring.

19. The storage system according to claim 14, wherein the default lock state value equals a value of the cycle counter at the beginning of the current lock recovery process.

\* \* \* \* \*